United States Patent [19]
Daniels et al.

[11] 3,749,110
[45] July 31, 1973

[54] SLUDGE FILTRATION DEVICE

[75] Inventors: Stacy L. Daniels; Joseph P. Graham, both of Midland, Mich.

[73] Assignee: The Dow Chemical Company, Midland, Mich.

[22] Filed: Apr. 5, 1972

[21] Appl. No.: 241,136

[52] U.S. Cl. .................................. 137/92, 73/61 R
[51] Int. Cl. .......................................... G05d 11/00
[58] Field of Search...................... 137/92, 4, 467.5; 73/61 R; 210/96

[56] References Cited
UNITED STATES PATENTS

| | | | |
|---|---|---|---|
| 2,880,654 | 4/1959 | Henry | 137/92 |
| 2,498,876 | 2/1950 | Bowen | 137/92 |
| 2,379,835 | 7/1945 | Sisler | 137/92 X |

Primary Examiner—Robert G. Nilson
Assistant Examiner—Edward Look
Attorney—William M. Yates and Earl D. Ayers

[57] ABSTRACT

The invention is a device for use in applying treating material to a filterable sludge such as sewage, for example. A small amount of sludge is applied to a porous surface. Detector means spaced from the point of application of the sludge senses the degree of flow of liquid from the sludge across the porous surface. The sensors are coupled to electrical means actuating flow control means in the treating material line to increase, decrease, or not affect the flow of treating material, depending on the rate said liquid path expands on said porous surface.

The porous surface moves. The application of sludge may be continuous or discontinuous.

7 Claims, 2 Drawing Figures

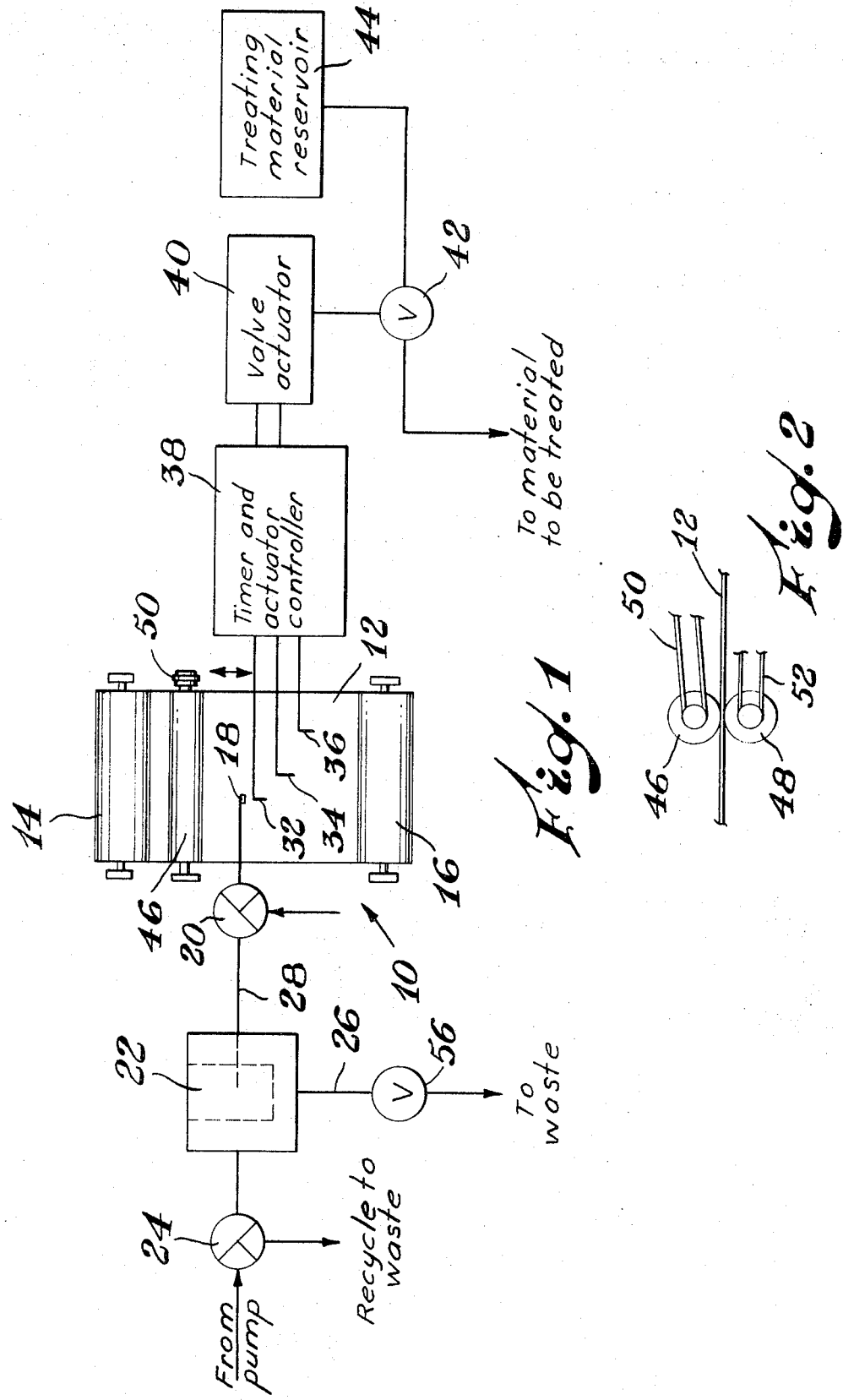

SLUDGE FILTRATION DEVICE

BACKGROUND OF THE INVENTION

This invention relates to apparatus for controlling the addition of treating material to a filterable liquid based medium, and particularly to apparatus wherein the rate of flow of liquid from said medium across a porous surface is used to control the addition of said treating material.

It is a common practice to add a material such as alum, ferric chloride or a suitable polyelectrolyte to sewage sludge to improve its filterability, but economics dictate that close control over the addition must be maintained if excessive costs are to be avoided.

It has been determined that the addition of the material to the sludge affects the rate liquid from the sludge passes across a porous surface by capillary action.

STATEMENT OF INVENTION

In accordance with this invention there is provided a moving sheet of porous material, means for applying a predetermined quantity of treated filterable liquid medium to said sheet, means spaced from the point of application of said medium for sensing the degree of spreading of said medium across said surface and means coupled to said sensing means.

BRIEF DESCRIPTION OF THE DRAWING

The invention, as well as objects and advantages thereof, will best be understood when the following detailed description is read in connection with the accompanying drawing, in which:

FIG. 1 is a diagrammatical view of apparatus in accordance with this invention, and FIG. 2 illustrates a drive means for the porous material used in the device of FIG. 1.

DETAILED DESCRIPTION OF THE DRAWING

Referring to the drawing, there is shown apparatus, indicated generally by the numeral 10, comprising porous material 12, a plastic backed filter type paper, for example, which is moved from one roll 14 to a second roll 16 by means of constant speed drive rollers 46, 48 which are driven by suitable drive source(s) (not shown) through drive belts 50, 52, respectively.

Sludge from a treated sewage is pumped through the valve 24 to a Cuno or other suitable filter 22 from which excess material is discharged to waste through the line 26 and valve 56. Filtered material is then passed through the line 28 and valve 20 to the nozzle 18.

Three sensors 32, 34, 36, which may be simple metal wiper contacts touching the porous material 12 are coupled to a timer and actuator controller 38 which in turn operates a valve actuator 40 to control the valve 42 in a line from a treating material reservoir to the material (sewage, usually) to be treated.

OPERATION

In operation, treated sewage is pumped from the sewage processing line through the filter 22 and is deposited onto the moving sheet of porous material 12.

Because of capillary attraction, the liquid of the sewage expands outwardly from its point of deposit. The rate of movement outwardly on the porous sheet is related to the amount of treating material previously applied to the sewage. The movement of the sheet 12 and the spacing of the sensors 32, 34, 36 are adjusted so that "normally" treated sewage liquid will wet the porous sheet to a point between sensors 34 and 36. If this situation occurs, no signal is given from the actuator controller to the valve actuator. If the porous material is not wetted to provide electrical conductivity between the sensors 32, 34, the output of the actuator controller energizes the valve actuator to increase flow through the valve by one step (a step-wise flow control is used, although it is realized that a proportional control system could be used).

If the porous material is wetted to provide electrical conductivity between sensors 34 and 36, the actuator controller energizes the valve actuator to decrease flow past the valve by one step.

The timer in the unit 38 usually operates on cycle of 5 or 10 minutes.

The various valves 24, 20 and 56 provide a convenient means for flushing or backwashing the equipment.

While it is practical to deposit sludge material on the porous surface of the material 12 on a discontinuous basis, continuous operation is preferred from a maintenance standpoint to minimize plugging of the small nozzle and line.

The actuator controller may be of simple construction. For example the sensor 34 may be grounded. Sensor 32 may be connected to ground in series with a relay which is normally closed and with a power source one side of which is grounded.

Sensor 36 is connected to a grounded power source through a relay which is normally open unless energized.

Thus, with no conductivity through the porous material between sensors 32 and 34 and with the timer closing a double pole switch one pole of which is in series with sensor 32 and the other pole of which is in series with sensor 36, the controller output would cause treating material flow to be increased so more wetting of the porous surface would occur.

If there was conductivity between sensors 32 and 34, the relay would be removed from its contact and there would be no output from the controller.

If conductivity existed between sensor 34 and sensor 36, the relay contact would be closed and the valve closed one step to reduce flow of the treating material.

Other sensors than wiper contacts may be used. Reflectance sensitive sensors may, for example, be used since the reflectance changes as the porous surface is wetted. Alternative controller circuits will suggest themselves to those skilled in the art.

What is claimed is:

1. Apparatus for use in controlling the addition of treating material to a filterable medium, comprising a moving sheet of porous material, means for applying a predetermined quantity of treated filterable liquid medium to said sheet, means spaced from the point of application of said medium for sensing the degree of spreading of said medium across the surface of said sheet, and means coupled to said sensing means for controlling the addition of treating material to said medium.

2. Apparatus in accordance with claim 1, wherein said means for sensing includes a sensor element for contacting said medium as applied to said sheet, a sensor element contacting said sheet along a part thereof which is wet by said medium during normal addition of treating agent to said medium, and a sensor element contacting said sheet along a part thereof which is dry if the addition of treating agent to the medium is in a normal range.

3. Apparatus in accordance with claim 1, wherein said sheet is moved linearly during operation of the apparatus, said movement being at a substantially constant rate.

4. Apparatus in accordance with claim 1, wherein said medium is applied continuously.

5. Apparatus in accordance with claim 1, wherein said means for controlling the addition of treating material operates for predetermined times.

6. Apparatus in accordance with claim 2, wherein said sensor elements are electrical wiper contacts.

7. Apparatus in accordance with claim 1, wherein said sheet is made of porous paper.

* * * * *